Oct. 28, 1952 A. G. COOLEY 2,615,780

STYLUS ASSEMBLY FOR FACSIMILE MACHINES

Filed Feb. 11, 1949 2 SHEETS—SHEET 1

INVENTOR.
AUSTIN G. COOLEY
BY John J. Rogan
ATTORNEY

STYLUS ASSEMBLY FOR FACSIMILE MACHINES

Filed Feb. 11, 1949 2 SHEETS—SHEET 2

INVENTOR.
AUSTIN G. COOLEY
BY
John J. Rogan
ATTORNEY

Patented Oct. 28, 1952

2,615,780

UNITED STATES PATENT OFFICE 2,615,780

STYLUS ASSEMBLY FOR FACSIMILE MACHINES

Austin G. Cooley, New York, N. Y., assignor to Times Facsimile Corporation, New York, N. Y., a corporation of New York Application February 11, 1949, Serial No. 75,793

4 Claims. (Cl. 346—139)

This invention relates to facsimile machines and more particularly it relates to machines having a recording stylus.

A principal object of the invention relates to an improved arrangement for pivotally mounting a facsimile recording stylus.

A feature of the invention relates to a facsimile stylus which is supported and held in rubbing and cushioned contact with a recording surface by magnetic action.

Another feature relates to a magnetically controlled stylus mounting for facsimile machines and the like, whereby the stylus can be expeditiously removed for cleaning, adjustment, or replacement.

A further feature relates to a novel arrangement for supporting a recording stylus whereby the stylus can be held in resilient light contact with the recording surface without requiring the use of biasing springs. As a result of this feature, the stylus automatically adapts itself to any irregularities in the thickness or surface of the recording sheet.

A still further feature relates to the novel organization, arrangement and relative interconnection of parts which cooperate to provide an improved stylus mounting for facsimile machines and the like.

Other features and advantages not specifically enumerated will be apparent after a consideration of the following detailed descriptions and the appended claims.

In the drawing which shows, by way of example, preferred embodiments.

In certain types of facsimile machines, the facsimile recording is effected by means of a metallic stylus which is in rubbing contact with the recording surface, the latter usually being in the form of a sheet mounted on a rotatable drum. When suitable facsimile signals are applied to the stylus, a current passes from the stylus through the recording sheet to leave a recording thereon in accordance with the received signals. In such arrangements, it is necessary that the stylus be held in resilient contact with the recording surface so that it adapts itself to any irregularities in the said surface. Heretofore, the required pressure of the stylus on the recording surface has been effected by means of a spring or weight, and one of the purposes of the present invention is to overcome the disadvantages inherent in the use of such pressure springs or weights. Because of the relatively fine construction of the stylus itself, it may require replacement or removal for cleaning purposes, adjustment or the like. Furthermore, since the stylus must be pivotally mounted, rather complex mountings have heretofore been required so that when the stylus was to be removed for any purpose, it required a rather delicate operation so as not to destroy the stylus or its mounting. In accordance with the present invention, the above-mentioned and other disadvantages are overcome by relying entirely upon magnetic forces for pivotally supporting the stylus and for supplying the necessary resilient or cushioning pressure between the stylus and the recording surface.

Figure 1:
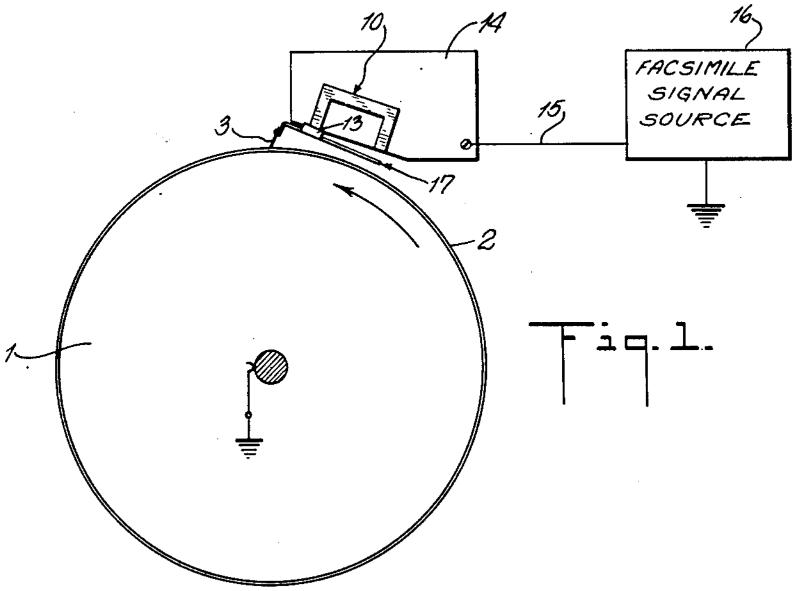
Fig. 1 is a composite schematic and structural diagram representing the recording drum and stylus mounting in end view.

Thus, there is shown in Fig. 1, a scanning drum 1 around which the recording strip 2 is wrapped and suitably fastened. This strip may take the form of any well-known facsimile recording paper whose surface is to be acted upon by impressed electric potentials to leave a record of the received facsimile signals. For a detailed description of a suitable paper, reference may be had to U. S. Patent No. 2,398,779. The drum 1 can be supported on a lead screw shaft so that as it rotates around its longitudinal axis, it is automatically fed along its axis so that all the successive elemental areas of the record sheet 2 are brought into registry with the stylus. If desired, the drum can merely rotate around its axis and the stylus can be traversed parallel to the said axis as is well-known in the art. In accordance with the achievements of the objects of the present invention, the stylus may take the form of a relatively fine wire 3 which is soldered or otherwise fastened at one end to the rigid metal strip 4 of magnetic material. For this purpose, the strip 4 has a right-angled projection 5 to which the stylus 3 is soldered or otherwise fastened at 6. The strip 4 adjacent one end is provided with a curved or integrally embossed rib 7 which is adapted to register with and fit within a corresponding curved channel 8 in one of the pole pieces 9 of a permanent magnet 10. The strip 4 is sufficiently long so that its opposite end extends beneath the other pole piece 11 of the permanent magnet. By reason of the engagement between the rib 7 and the channel 8 and by reason of the magnetic attraction between the magnet and the member 4, the latter is held against longitudinal displacement. In order to prevent lateral displacement of the member 4, it is provided on opposite edges with a pair of struck-up flanges 12, 13, which engage the opposite faces of the pole piece 9. The magnet 10 is suitably fastened to a bracket or holder 14, which can be suitably insulated from the framework of the machine so that it can be connected by a conductor 15 to any well-known source 16 of facsimile signal currents. The holder 14 can form part of the usual carriage which can be moved parallel to the rotational axis of drum 1 by any suitable means such as a lead screw as is well-known in the facsimile recorder art.

As shown more clearly in Fig. 1, the holder 14 is mounted so that the stylus 3 engages the recording paper 2 at an acute angle facing the direction of rotation of the drum 1. The holder 14 is so mounted that the pressure of the stylus 3 on the surface 2, causes the opposite end 17 of member 4 to be held in spaced relation to the pole piece 11. However, because of the magnetic field from the magnet, there is a steady magnetic pull on the end 17, thus assuring that the stylus 3 is held resiliently or in cushioned contact with the surface 2. Consequently, the stylus 3 automatically adjusts itself regardless of the thickness of the recording stylus 2. The mount of this continuous magnetic pull can be regulated, if desired, by adjusting the angular position of the magnet on the holder 14 with respect to the surface 2.

With the foregoing described construction, it will be observed that the stylus can be removed simply by pulling the arm 4 away from the magnet 10 since it is not fastened to the magnet by screws or similar fastening means. If desired, the stylus 3 can be fastened to the member 4 by a suitable clip or set screw so that it can be easily removed from the member 4 and replaced after this latter member has been pulled away from the magnet 10.

Figures 2, 3, 4, 5:
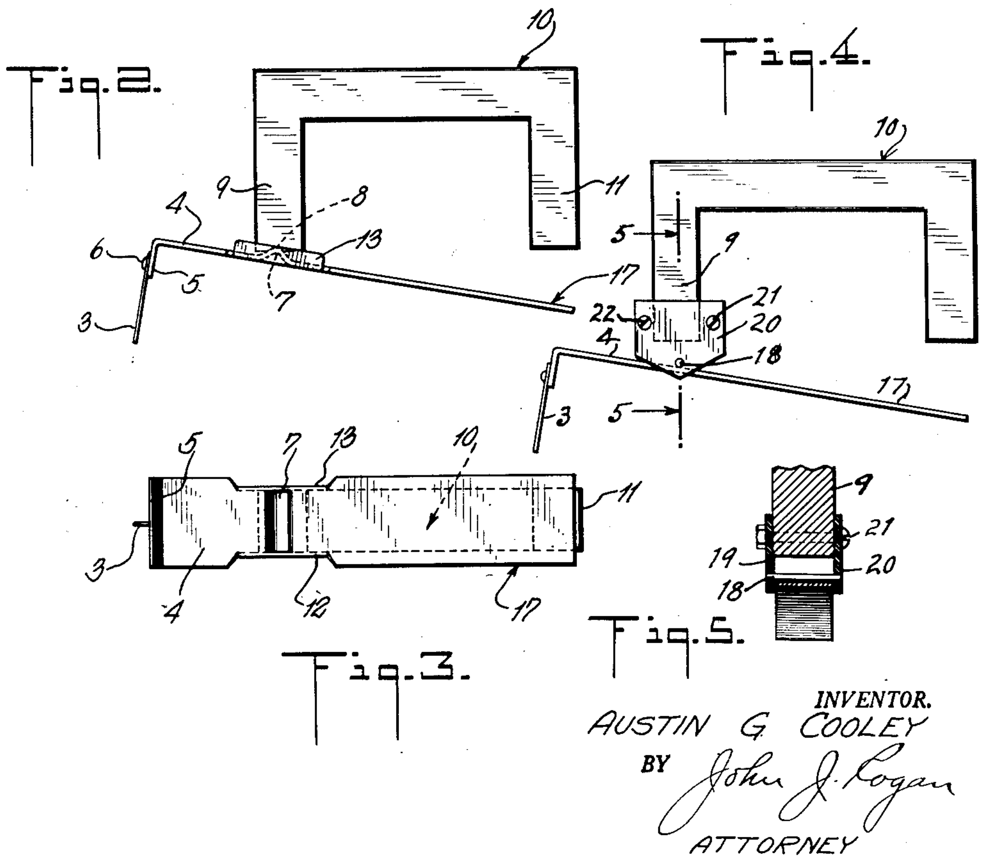
Fig. 2 is an enlarged detail of the stylus mounting of Fig. 1.
Fig. 3 is a bottom view of Fig. 2.
Fig. 4 is a modified embodiment of the invention.
Fig. 5 is a sectional view of part of Fig. 4, taken along the line 5—5 thereof.

Figs. 4 and 5 show a modification wherein the member 4 which carries the stylus 3 has attached thereto, for example by soldering, a transversely extending wire 18 which is pivotally mounted between two spaced plates 19, 20, clamped against opposite sides of the pole piece 9 of magnet 10 by means of screws 21, 22.

Referring to Figs. 6 to 10, there is shown a preferred modification wherein certain parts which are identical with corresponding parts of Figs. 1 to 5, bear the same designation numerals. In this modification, the stylus 3 is attached to an arm 23 which is round in cross section and adapted to fit within a circular bore 24 in a rockable bearing block 25. The arm 23 has, at one end a flat 26, shorter than the thickness of block 25 so as to provide a small clearance between the stylus arm and the block to facilitate removal of the stylus arm as will be described hereinbelow.

The block 25 can be formed as an integral unit or casting with the lateral cylindrical portions 27, 28, which also carry at their ends integral bearing pins 29, 30, supported for rotation in the side plates 31, 32, carried by the member 14. Suitably fastened to the rear face of block 25 is an iron plate or armature 33, which cooperates with the permanent magnet 10. Thus when the stylus 3 is in rubbing contact with surface 2, the block 25 and member 33 are held so that armature 33 is slightly spaced from the pole piece 9, and the magnet 10 holds the stylus 3 with the desired cushioned pressure against the surface 2 as hereinabove described.

Figure 8:
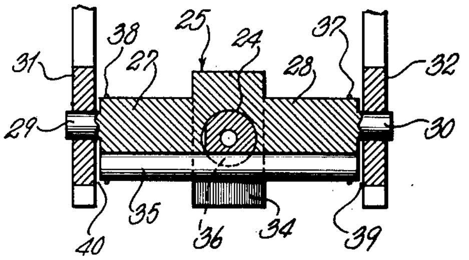
Fig. 8 is a sectional view of Fig. 6, taken along the line 8—8 thereof.

In order to lock the stylus arm in place, the underface of block 25 and its integral portions 27, 28, is provided with a channel or groove 34 to receive a locking pin 35. It will also be noted that the stylus arm 23 has on its underside a notch 36 which conforms to the curvature of the pin 35. The dimensions of the notch 36 and of the channel 34 are correlated so that when the pin 35 is in locking position in the groove 34 and notch 36, as shown in Fig. 8, its periphery is substantially flush with the curved periphery of the portions 27 and 28. Pin 35 is held in place by a pair of split retainer rings 37, 38, which surround the end portions of sections 27 and 28. In order to prevent binding of the stylus bearing block during its rocking motion, slight clearances 39, 40, are provided between each end of the sections 27, 28, and their respective side plates 31, 32.

From the foregoing description, it will be seen that the stylus assembly is such that the stylus can be expeditiously removed for cleaning, repair, or replacement, without requiring any special tools. All that is necessary to remove the stylus is to turn it through approximately one-quarter turn until the notch 36 disengages the pin 35 whereupon the stylus arm and its stylus can be easily pulled out of the block 25. This operation is possible because of the resiliency of the springs 37 and 38, so that when the stylus arm is turned for removal it acts as a cam to lower the pin 35 to enable the arm 23 to clear the said pin for removal. However, because of the length of the groove 34 and the block 35, the pin 35 does not entirely leave the said groove 34, with the result that when the stylus arm is withdrawn, the pin 35 immediately springs back into engagement with the wall of the groove 34. Likewise, in replacing the stylus, all that is necessary is to insert the stylus arm in such a way that the flat 26 is parallel to the length of pin 35. When the arm has been inserted to the position shown in Fig. 10, it can then be turned through approximately one-quarter turn to enable the notch 36 to engage the pin 35.

Figure 6:
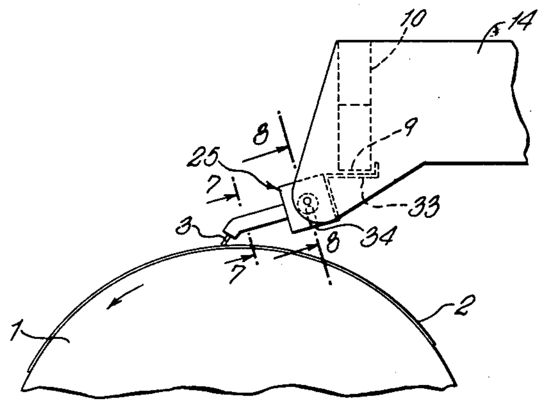
Fig. 6 is a view similar to that of Fig. 1, but of a preferred modification of the invention.
Figure 7:
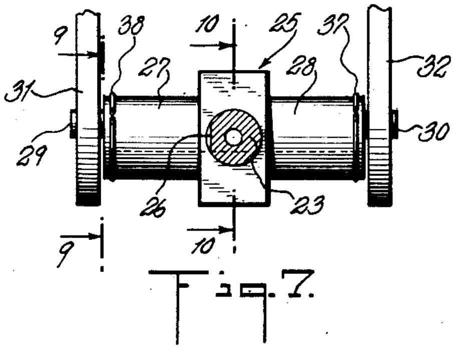
Fig. 7 is a sectional view of Fig. 6, taken along the line 7—7 thereof.
Figures 9, 10, 11:
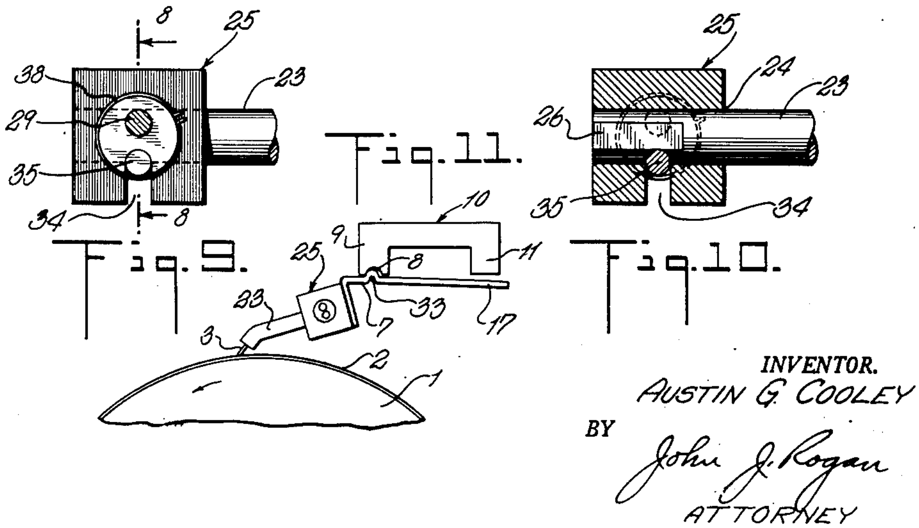
Fig. 9 is a sectional view of Fig. 7, taken along the line 9—9 thereof.
Fig. 10 is a sectional view of Fig. 7, taken along the line 10—10 thereof.
Fig. 11 shows a further modification of the embodiment of Figs. 6 to 10.

While Fig. 6 shows the stylus arm and its magnetic controlling armature 33 supported in fixed bearings in the plates 31 and 32, it will be understood that the stylus assembly can be supported on the permanent magnet solely by magnetic attraction as described above in connection with Figs. 1 to 3. Such an arrangement is shown in Fig. 11, it being understood that the stylus 3 with its arm 23 is removably mounted in the block 25 as shown in detail in Figs. 7 to 10. However, in Fig. 11, the armature 33 is provided with a transverse ridge 7 which registers with the corresponding slot 8 in the magnet pole 9, so as to provide a pivotal mounting. The extreme end 17 of the member 33 is then in spaced relation to the pole piece 11. With this arrangement, the entire stylus assembly is supported solely by the magnetic attraction between the member 33 and the magnet. In the constructions described hereinabove, the support for the permanent magnet also includes the support for the stylus pivot, and the magnet is so close to the pivot that the stylus can wear away appreciably in length, without materially changing the pull of the magnet tending to hold the stylus in contact with the record paper. To facilitate this, the stylus holder and the armature for the magnet form a compact structure which, being small and light, can be supported solely by the pull of the magnet. This construction differs from the conventional stylus mountings such as are used in connection with grooved phonograph records and the like. The ordinary phonograph needle or stylus does not appreciably wear away in length, whereas a facsimile wire stylus since it carries considerable electric current wears or burns away in length rather rapidly, and yet the stylus even after such wearing away, must still engage the recording paper with a predetermined pressure. Furthermore, in facsimile machines of the stylus type, it is not uncommon that the record paper be provided with an overlap or bump or that the paper be held on the drum by a longitudinally extending clamp bar, or length of fastening tape which must rotate with the drum and therefore must ride under the stylus. It is necessary therefore, that the stylus ride over such bumps or obstructions without any difficulty, and without introducing any resonant vibrations as would be the case if springs, stretched cords or the like are attached to the stylus holder.

While certain particular embodiments have been described herein, it will be understood that various changes and modifications may be made therein without departing from the spirit and scope of the invention.

This application is a continuation-in-part of application Serial No. 787,779, filed November 24, 1947, now abandoned.

What is claimed is:

1. A stylus arrangement for facsimile machines, comprising, a member mounted for rocking movement, a stylus arm having one end fitted into said member, said member having a groove extending transversely to said stylus arm and said stylus arm having a notch in registry with said groove, and a locking member located in said groove and notch to lock said arm to said member for unitary rocking movement with said member, said arm being mounted in said member for rotation in a direction at right angles to said rocking movement to facilitate insertion and removal of the stylus.

2. A stylus arrangement according to claim 1, in which said arm is removably fitted into said member and has a flat adjacent its end where it is fitted into said member for the purpose set forth.

3. A stylus arrangement for facsimile machines, comprising, a member mounted for rocking movement, a bore through said member, a stylus arm removably fitted into said bore, said member having a groove extending along its peripheral length and communicating with said bore, said arm also having a notch in registry with said groove, and a locking pin located in said groove and notch to lock said arm to said member for unitary rocking movement with said member, said arm being mounted in said member for rotation in a direction at right angles to said rocking movement to facilitate insertion and removal of the stylus.

4. A stylus arrangement according to claim 3, in which a split ring surrounds said member and pin to retain said pin in said groove and in said notch.

AUSTIN G. COOLEY.

REFERENCES CITED

The following references are of record in the file of this patent:

UNITED STATES PATENTS

| Number | Name | Date |
|---|---|---|
| 271,143 | Smith | Jan. 23, 1883 |
| 814,561 | Parsons | Mar. 6, 1906 |
| 831,995 | Runge | Sept. 25, 1906 |
| 838,638 | McKay | Dec. 18, 1906 |
| 1,814,655 | Andreasson | July 14, 1931 |
| 1,836,153 | Capps | Dec. 15, 1931 |
| 2,315,362 | Wise et al. | Mar. 30, 1943 |
| 2,398,666 | Reason | Apr. 16 1946 |
| 2,415,229 | Young | Feb. 4, 1947 |
| 2,451,221 | Hutter | Oct. 12, 1948 |